United States Patent
Scholl (10) Patent No.: US 8,949,459 B1
(45) Date of Patent: Feb. 3, 2015

(54) METHODS AND APPARATUS FOR DISTRIBUTED BACKBONE INTERNET DDOS MITIGATION VIA TRANSIT PROVIDERS

(75) Inventor: Thomas Bradley Scholl, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 158 days.

(21) Appl. No.: 13/284,639

(22) Filed: Oct. 28, 2011

Related U.S. Application Data (60) Provisional application No. 61/544,129, filed on Oct. 6, 2011.

(51) Int. Cl.
H04L 29/06 (2006.01)

(52) U.S. Cl.
CPC .................................. *H04L 63/1458* (2013.01)
USPC ........................................................ 709/239

(58) Field of Classification Search
USPC ........................................................ 709/239
See application file for complete search history.

(56) References Cited

U.S. PATENT DOCUMENTS

| | | | |
|---|---|---|---|
| 7,028,179 B2 | 4/2006 | Anderson et al. | |
| 7,171,683 B2 | 1/2007 | Pazi et al. | |
| 7,188,366 B2 | 3/2007 | Chen et al. | |
| 7,200,866 B2 | 4/2007 | Kim et al. | |
| 7,568,232 B2 | 7/2009 | Mitomo et al. | |
| 7,925,766 B2 | 4/2011 | Jayawardena et al. | |
| 8,001,601 B2 | 8/2011 | Duffield et al. | |
| 2003/0145232 A1* | 7/2003 | Poletto et al. | 713/201 |
| 2004/0148520 A1* | 7/2004 | Talpade et al. | 713/201 |
| 2006/0185014 A1* | 8/2006 | Spatscheck et al. | 726/23 |
| 2006/0236401 A1 | 10/2006 | Fosdick | |
| 2007/0130619 A1 | 6/2007 | Reams, III | |
| 2010/0212005 A1 | 8/2010 | Eswaran et al. | |
| 2010/0235902 A1 | 9/2010 | Guo et al. | |
| 2011/0072516 A1 | 3/2011 | Cohen et al. | |
| 2011/0255553 A1* | 10/2011 | Bobba et al. | 370/429 |
| 2011/0276446 A1* | 11/2011 | Gupta et al. | 705/34 |
| 2013/0263256 A1* | 10/2013 | Dickinson et al. | 726/22 |

OTHER PUBLICATIONS

Rekhter, et al., "A Border Gateway Protocol (BGP-4)," The Internet Society, Jan. 2006, all pages.

* cited by examiner

*Primary Examiner* — Huy D Vu
*Assistant Examiner* — Bao G Nguyen
(74) *Attorney, Agent, or Firm* — Robert C. Kowert; Meyertons, Hood, Kivlin, Kowert & Goetzel, P.C.

(57) ABSTRACT

Methods and apparatus for distributed Internet backbone DDOS (distributed denial of service) mitigation via transit providers. A provider network may include a data center and a remote point of presence (RPOP) linked to the data center by private backbone links. The data center may include servers, a traffic analyzer and a routing information generator. The traffic analyzer determines a target address to which a pattern of traffic matching a profile is detected. The routing information generator may generate new routing information for the target address that avoids the use of the backbone, and provide the information to an IP transit provider. The IP transit provider propagates the new routing information to the RPOP, which directs subsequent traffic to the target address over a path that excludes the backbone.

21 Claims, 8 Drawing Sheets

|  | Destination | Mask | Gateway |
|---|---|---|---|
| E1 → | 192.168.0.0 | 255.255.0.0 | 192.168.66.3 |
| E2 → | 13.0.0.0 | 255.255.255.0 | 13.2.3.0 |
| E3 → | 10.0.0.0 | 255.255.255.0 | 10.63.1.0 |
| E4 → | 0.0.0.0 | 0.0.0.0 | 10.62.1.3 |

*Figure 6a*

|  | Destination | Mask | Gateway |
|---|---|---|---|
| E1 → | 192.168.0.0 | 255.255.0.0 | 192.168.66.3 |
| E2 → | 13.0.0.0 | 255.255.255.0 | 13.2.3.0 |
| E5 → | 10.0.0.123 | 255.255.255.255 | 13.2.3.0 |
| E3 → | 10.0.0.0 | 255.255.255.0 | 10.63.1.0 |
| E4 → | 0.0.0.0 | 0.0.0.0 | 10.62.1.3 |

METHODS AND APPARATUS FOR DISTRIBUTED BACKBONE INTERNET DDOS MITIGATION VIA TRANSIT PROVIDERS

PRIORITY INFORMATION

This application claims benefit of priority of U.S. Provisional Application Ser. No. 61/544,129 entitled "METHODS AND APPARATUS FOR DISTRIBUTED BACKBONE INTERNET DDOS MITIGATION VIA TRANSIT PROVIDERS" filed Oct. 6, 2011, the content of which is incorporated by reference herein in its entirety.

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several regions or even countries, and may include numerous data centers with varying levels of services and facilities available, utilized together to provide a unified set of services to their end customers.

In some cases, dedicated private network links, which are sometimes referred to as backbone links, may be set up between a set of major data centers and other sites of a provider network. For example, a set of core services (such as a back-end database for a content distribution service) may be implemented physically at one data center or a small group of data centers, and made accessible to clients of the provider via more numerous remote points of presence (RPOPs) distributed throughout the world. The RPOPs may receive incoming traffic (such as service requests) from client devices over networks external to the provider's private network, i.e., the RPOPs may server as access points for customers to the provider's private network. The RPOPs may be configured to use the backbone links as needed to communicate back and forth with the core service data centers to respond to client requests. Alternate paths between the RPOPs and the core data centers, such as paths that include links managed by IP transit providers and other third parties may also be available. Since the backbone links are managed by and for the service provider alone, and are not accessible directly from external networks, the service provider may have finer control on the quality of service of network transmissions over the backbone links. For example, in some cases it may be much faster on average to send messages over the backbone links than over alternate paths, or the variation in message transmission times may be kept lower on the backbone links than on external links generally available to users other than the provider network's own servers.

In many cases, the backbone links may be more expensive than the alternate paths, however. Even though the bandwidth capacity of individual backbone paths may be high, in some cases the maximum bandwidth available over the backbone links may be less than the aggregate bandwidth available over a combination of alternate paths over external networks. The service provider may have to consider the different costs and service characteristics of the backbone links versus the alternate paths while managing the traffic needed to support the services provided to its clients. The task of traffic management may become even more complicated in the presence of network attacks and intrusions, such as distributed denial of service attacks, which can potentially consume large amounts of bandwidth at least temporarily. While devices such as scrubber appliances and other network intrusion detectors may be available to respond to various kinds of network attacks, such devices are often expensive and it may be cost prohibitive to deploy such devices widely.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for responding to detected traffic patterns, such as suspected distributed denial of service (DDOS) attacks, by modifying routing information at provider networks that include private backbone links are described. Networks set up by an entity such as a company or a public sector organization to provide one or more services over the Internet such as content distribution or cloud-based storage to a distributed set of clients are termed provider networks in this document. Such a provider network may include a variety of sites, including primary data centers, remote points of presence (RPOPs), and/or other locations hosting various computer servers and devices needed to implement and distribute the services offered by the provider. In some embodiments, the core computation functionality and/or storage services required for the provider's services may be implemented at one or more primary data centers, and the RPOPs may provide access to end users from geographical locations that are closer to the end user locations. The RPOPs may be linked to the data centers via the private backbone links that may be owned or managed by the provider network's owners, as well as by other paths that are at least partially owned or managed by entities other than the provider network's owners. In some embodiments the RPOPs themselves may be data centers with different levels of equipment, capabilities and services available than are available at the primary data centers of the provider As traffic flows in and out of the data center in accordance with routing information that has been previously propagated from the data center, a traffic analyzer may be operable to determine a target address of a server at a data center to which a pattern of network messages that corresponds to a particular traffic profile is being directed. This traffic profile may indicate, for an example, that a threshold probability that the server is the target of a network attack from some external system or systems has been reached or exceeded. In response to the determination of the target address, in one embodiment a routing information generator at the data center may be operable to generate new routing for that target address, where the new routing avoids the use of the backbone links. The routing information generator may provide the new routing information to one or more third party network management entities, such as an Internet Protocol (IP) transit provider that transfers network packets between the provider network and other portions of the wider Internet. The third party network management entity may in turn propagate the new routing information to other entities, including for example, routers at one or more RPOPs. When such an RPOP receives subsequent traffic directed at the target address (which may include messages that match the suspect traffic profile and may include other messages as well), it directs this subsequent traffic along the routes indicated in the new routing information, thus avoiding the use of the backbone links for the suspect traffic.

In various embodiments, a number of alternative paths may be available for transmission of network traffic in both directions between the provider network's RPOPs and data centers, and the end users that utilize the services implemented by the provider network. These alternative paths include links and network devices managed by IP transit providers as well as by settlement-free peering partners of the provider network. The term "IP transit provider", as used in this document, refers to an entity that transmits network traffic across its network links to (and from) its customers' networks in exchange for monetary compensation. The compensation may be based on maximum bandwidth made available by the transit provider, or on other service characteristics. In contrast, the term "settlement-free peering partner" is used herein to refer to an entity that transmits network traffic originating from, and directed to, its partners such as the provider network, without monetary compensation from the partners. In return, the provider network may also permit traffic to flow to and from its peering partner without receiving monetary compensation. In addition to these two types of entities, other third-party carriers such as various wireless and wired network providers, telecommunication carriers companies and the like may also provide access to the systems and services of the provider network in some embodiments.

Example Provider Network Environment

Figure 1:
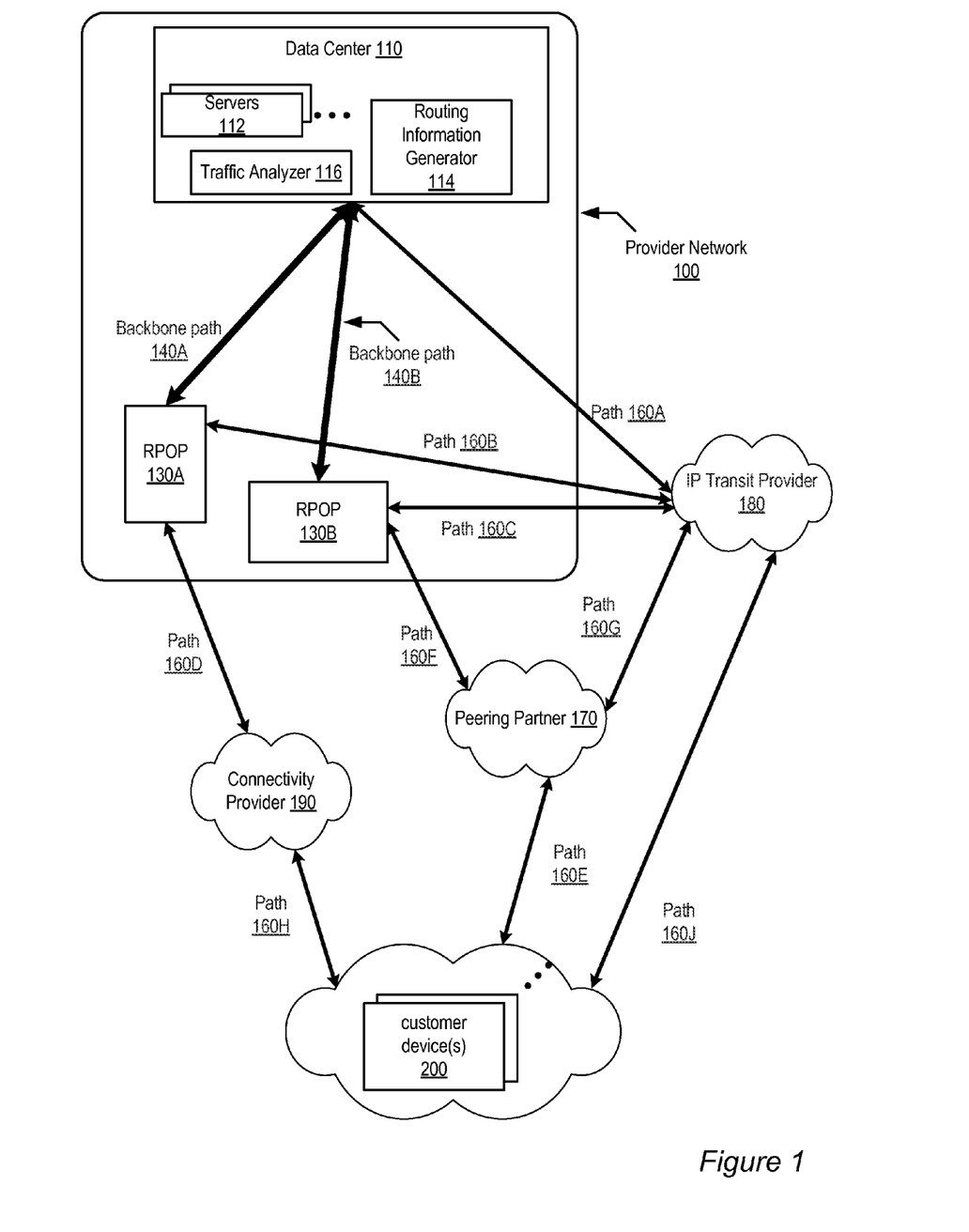
FIG. 1 illustrates an example provider network environment, according to at least some embodiments.

FIG. 1 illustrates an example provider network environment, according to at least some embodiments. The provider network 100 may include one or more data centers 110 and one or more remote points of presence 130 (e.g., RPOP 130A and RPOP 130B in FIG. 1). End users of the services offered by the provider network may use customer devices 200 to make requests to, and receive responses from, the provider network over the Internet. For example, the provider network may offer content distribution services to a content provider such as a news service or a video streaming company. An end user may request access to a particular news article or video from the user's home or workplace using customer devices 200. Such a request may eventually be routed to one of the RPOPs 130 over various components of the Internet. The RPOP 130 may transmit the request back to one of the servers at the data center, and may receive a response (or multiple responses) from that server which may then be transmitted back to the customer device 200 at the end user's premises.

A variety of different network paths may be available for traffic to flow between the end users and the servers of the provider network in different embodiments. In some cases the traffic between the customer devices 200 and the provider network 100 may flow through devices and links managed by an IP transit provider 180, e.g., through paths 160J and 160A. The term "path" as used herein, broadly refers to the set of links and devices traversed by a network message or packet between a source device and a destination device. The set of links of a given path may, in some cases, comprise a single wire, as when the source and destination may be linked directly by a physical cable. In other cases the path may include multiple wired and/or wireless links and several intermediary devices such as switches, gateways, routers and the like. Paths may comprise unidirectional and/or bidirectional physical links.

As shown in FIG. 1, in some embodiments a path from a customer device 200 to the data center may include elements managed by a settlement-free peering partner 170—for example, paths 160E and 160F to RPOP 130B. Other connectivity providers 190 may provide alternate routes for customer request and/or response traffic in some embodiments (such as path 160H and 160D to RPOP 130A). Network traffic to and from the customer devices may also flow through a combination of these entities—for example a network packet originating at a customer device 200 may in some cases be routed over path 160E to peering partner 170, then through path 160G to the transit provider, then through path 160B to RPOP 130A.

Within provider network 100, RPOPs such as 130A and 130B may be linked to the data center via dedicated private backbone paths 140, such as 140A and 140B. A private backbone path 140 may differ from the non-backbone paths 160A-160G in one or more of several properties in various embodiments. Direct use of a backbone path 140 may be limited to devices and servers of the provider network, i.e., a network packet may only be physically transmitted upon a link of the backbone path from a device owned or managed by the owner of the provider network. A backbone path such as 140A may also comprise several distinct physical links and/or intermediary devices. Note that backbone paths such as 140A and 140B may not be the only paths available between RPOPs and data center 110—for example, message may be transmitted from RPOP 130B to data center 110 via paths 160C and 160A. In some environments backbone links 140A and 140B may utilize specialized hardware and/or software to provide a higher quality of service than may be generally obtained over the public Internet. Modified versions of standards-based open networking protocols (or even proprietary network protocols) may be used to manage traffic over backbone networks 140 in some cases to meet specific high-end requirements of the provider networks. In some environments the service levels demanded from, and provided by, the backbone paths 140 may result in network transmission costs that may exceed the costs of transferring the same amount of data over IP transit providers 180 or other third party networks that are not directly controlled by the entity managing provider network 100. In some cases, even though the backbone paths may offer superior service levels for individual transmissions than the IP transit provider 180 does, the total network bandwidth available on a backbone path between a given RPOP 130 and a data center 110 may be smaller than the aggregate bandwidth available from one or more IP transit providers 180. Provider network 100 may implement a variety of static and/or dynamic rules or policies to make the most effective tradeoff between using the bandwidth available on backbone paths 140 and the bandwidth available through IP transit providers 180.

In one embodiment, data center 100 may comprise a plurality of servers 112, a traffic analyzer 116 and a routing information generator 114. In addition, the data center may also include a variety of other devices, such as storage devices and arrays, not illustrated in FIG. 1. Servers 112 may comprise a variety of computer systems (including, for example, multiprocessor or uniprocessor systems running any desired operating systems and application stacks) organized to provide various elements of the service offered to end user customers. Traffic analyzer 116 may be configured to monitor incoming traffic addressed to servers 112, and to detect whether the incoming traffic pattern matches one or more traffic profiles. In some embodiments one or more of the traffic profiles may be indicative of a network-based intrusion or attack on the server, such as a denial of service attack or a distributed denial of service (DDOS) attack.

In general, a denial of service attack attempts to make a server 112 unavailable to its intended users. One common method of a denial of service attack involves saturating the target server 112 with requests, such that the target server can no longer respond to legitimate requests, or responds so slowly that it is rendered effectively unavailable—that is, users of the service provided by the target server may conclude that the services being offered by the server 112 are no longer available. A distributed denial of service attack is a commonly observed type of denial of service attack in which the illegitimate requests are coordinated from multiple source systems that may have unrelated IP addresses, thus making the attack even harder to detect. DDOS attacks are often targeted at high-profile web providers such as banks, retailers, content distributors and the like. Attempts to saturate a server via a denial of service attack can in general take many forms, involving for example consumption of bandwidth, disk space, or processor time; disruption of configuration information; and/or disruption of state information such as unsolicited resetting of TCP sessions. Various elements of the networking protocols in common use over the Internet, such as ICMP and TCP/IP may be subverted or misused during denial of service attacks. For example, in one type of denial of service attack, a flood or succession of TCP SYN (synchronize) messages that are normally sent by clients during TCP connection establishment may be sent to a target server, and then when the server responds and waits for an acknowledgment (ACK) from the client, no acknowledgments may be sent, causing more and more resources to be used up at the target server.

Traffic analyzer 116 may comprise hardware and/or software capable of determining the probability that a suspected denial of service attack is being attempted in some embodiments. In some environments, a dedicated hardware appliance (which may be referred to as a scrubber appliance) may be used for DDOS detection. In other environments, a software-only traffic analyzer may be employed, or a combination of multiple software and hardware network intrusion detectors may be used. In many embodiments, the determinations made by the traffic analyzer 116 are probabilistic in nature—that is, the analysis may indicate whether a denial of service attack is in progress with a probability over a threshold, or may even provide the estimated probability of such an attack being in progress, but it may not be possible to verify with certainty that such an attack is in fact in progress. Further, in most cases, especially for servers 112 that have a non-trivial amount of legitimate traffic being directed towards them, traffic that is part of an attack may often be mingled with legitimate requests that should not be discarded. In various embodiments, the speed with which a traffic analyzer 116 determines that an attack is in progress can vary—some determinations of an attack in progress may take just a few seconds, whereas in other cases several tens of seconds, or even longer time periods, may be required. Since the process of determining whether an attack is occurring may be based on probabilistic analysis, it may well be the case that a traffic analyzer 116 may sometimes incorrectly conclude that an attack is in progress, whereas in fact the traffic that it suspects as being attack traffic may simply reflect a temporary increase in legitimate user load. For these reasons at least, an appropriate response to a suspected attack is often not easy to select.

In an embodiment illustrated in FIG. 1, traffic analyzer 116 is operable to determine a target address of one of the servers 112 to which a pattern of messages matching a traffic profile is directed. The pattern of messages may have been routed to the server 112 based on a first set of routing information previously provided from data center 110. For example, one or more routing information generators 114 may have previously advertised a set of routes to reach the servers 112 using Classless Inter-Domain Routing (CIDR) notation and the Border Gateway Protocol (BGP), and the traffic may have been routed towards the server 112 using the advertised routes.

The BGP is the most commonly used protocol for exchanging routing information between gateway hosts (each of which has its own router) in a network of autonomous systems. (Within the Internet, an autonomous system may be defined as a collection of connected Internet Protocol (IP) routing prefixes under the control of one or more network operators that present a common, clearly defined routing policy to the Internet for that collection of prefixes.) BGP is typically implemented using a table of IP networks or prefixes at each router, which designates network reachability among the autonomous systems. This routing table may contain a list of known routers, the addresses they can reach, and a cost metric associated with the path to each router so that the best available route may be chosen. Hosts using BGP typically communicate using the Transmission Control Protocol (TCP) and send updated router table information when needed, e.g. when a host has detected a routing change. To reduce the amount of routing data transmitted, only the changed part of the routing table may be sent. Some versions of BGP let administrators configure cost metrics based on policy statements. In general, when a given BGP router decides to advertise a route to other BGP routers, this information is placed in a BGP Update message, which is then sent to other BGP routers for which a BGP session has been established from that given router. In this way, routing changes may be propagated across the network. A BGP Update message may contain one or both of the following: a route advertisement (the characteristics of a single route), and a route withdrawal (a list of networks that are no longer reachable).

In FIG. 1, a BGP advertisement, indicating for example that packets targeted at address range 10.0.0.0/24 (in CIDR notation) should be directed towards the data center 110, may have been initially transmitted from the data center 110 to one or more routers at IP transit provider 180 and/or other providers, and may have been propagated from those initial routers to additional routers. (In the example above, the notation 10.0.0.0/24 is interpreted as follows: the 10.0.0.0 indicates the starting address of a range of IP addresses; and the 24 specifies the decimal number of the leading bits of the routing prefix for that range. In this case the 24 leading bits imply that, in the range of IP addresses being advertised, the first three dot-separated digits are to remain constant—10, 0, and 0 in this case, each accounting for 8 of the 24 bits. This leaves a range of 256 addresses covered by the range— 10.0.0.0 through 10.0.0.255.) This initial routing information may have been received at one or more routers within RPOPs 130, and may have been used by an RPOP to transmit data addressed to a server 112 towards the data center 110.

The traffic detected by traffic analyzer 166 that matches the pattern may have arrived at data center 110 over any combination of the paths available—a backbone path 140, a non-backbone path 160, or a combination of both types of paths. In response to the traffic analyzer 116 determining the target address, routing information generator 114 may be operable to generate new routing information that includes a route to the targeted server that excludes the backbone paths 140, and provide the new routing information to the IP transit provider 180. For example, if the IP address to which an ongoing attack is suspected were 10.0.0.123, a unique advertisement for that specific address (10.0.0.123/32 in CIDR notation) may be transmitted to the IP transit provider 180. The IP transit provider 180 may then propagate the new routing information to other routers, including routers within the RPOPs 130. In accordance with the new routing information received, the RPOPs 130 may be operable to direct additional incoming traffic addressed to the target address over a route that does not include a backbone path 140. For example, such traffic, received at RPOP 130B from peering partner 170, may be sent from RPOP 130B to the IP transit provider 180 and from the IP transit provider 180 to the data center 110 over path 160A. The RPOPs 130 may also propagate the new routing information to other routers, for example routers of the settlement-free peering partner 170 and other connectivity providers 190; in some environments the new routing information may eventually reach routers within the customer networks where customer devices 200 are located. In some embodiments the routing information exchanged among the data center 110, the IP transit provider 180, the RPOPs 130, the peering partners 170, other connectivity providers such as provider 190, and/or the customer networks may include cost metrics associated with various routes, and such metrics may be used in making routing decisions. In such an embodiment, the new routing information may indicate that the cost of sending a packet to the target server 112 from an RPOP 130A via the IP transit provider 180 is now less than the cost of sending that packet to target server 112 via backbone link 140A, thus indicating that the non-backbone route is now the preferred route.

In an embodiment illustrated in FIG. 1, the effect of generating the new routing information and propagating it as described above is thus to ensure that traffic directed to the target address after the detection of the traffic pattern does not pass through the backbone links 140. As noted above, it may be the case that the analysis performed at traffic analyzer 116 has in fact correctly determined that an attack is in progress; or, the determination may have been in error. In the case where an attack actually is in progress, the backbone paths 140 are protected by the techniques described above from the extra traffic of the attack, and any legitimate traffic intermingled with the attack traffic still reaches the intended destination. In the case where no attack occurs, and all the traffic was legitimate, the legitimate data still reaches the intended destination, although over a different path than may have been used prior to the traffic analyzer's detection of the pattern. The backbone paths 140 are thereby protected from traffic that could potentially have used up large portions of the backbone bandwidth available, and no legitimate data is lost. In the case of an actual attack, traffic analyzer 116 may take some additional action on the attack messages in some embodiments—for example, discarding messages that are identified as attack messages instead of transmitting them on to servers 112. In some embodiments, as described below in conjunction with the discussion of FIG. 7, the traffic analyzer 116 and the routing information generator 114 may be operable to undo the effects of propagating the new routing information if and when the suspected attack or malicious traffic is found to have ceased—in one such embodiment, for example, the advertisement specific to the target address may be withdrawn in accordance with BGP.

While BGP is a very commonly used protocol for transmitting routing decisions, the techniques described above may be used with extensions or variations of the standard version of BGP, or with any other appropriate protocol in various embodiments. In some embodiments, a service agreement between the provider network 110 and IP transit provider 180 may allow the use of other protocols and/or message formats to implement the kinds of routing-related changes described above. Notations other than CIDR may be used in some embodiments. In one embodiment, specific policies or rules may be negotiated and agreed upon by the IP transit providers and the provider network operators in order to implement the kinds of techniques described above.

Although FIG. 1 illustrates traffic analyzer 116 and routing information generator 114 separately, in some embodiments the functionality of traffic analyzer 116 and the routing information generator 114 may be incorporated within a single hardware device or within a single software program. For example, an intelligent network intrusion detector or scrubbing appliance may be operable to provide the functions of both the traffic analyzer and the routing information generator described above. In one environment, advanced routers may be used to perform both sets of functions. A variety of techniques, such as for example deep packet inspection, application-protocol based intrusion detection schemes, statistical anomaly-based intrusion detection schemes, or some combination thereof, may be used by traffic analyzers 116 in different embodiments to match the traffic profiles. A traffic profile may be specified or expressed using a variety of approaches: for example, based on the order and timing of incoming network packets of a particular packet type, or on the distribution of origin addresses, or on the packet data content.

The description of traffic analyzer 116's operation in the embodiments described above has been focused on detecting attacks such as denial of service attacks. In other embodiments, a traffic profile detectable by traffic analyzer 116 may simply indicate other unusual characteristics of the end-user requests or intermediate devices in the network, which may or may not be indicative of deliberate attacks, and routing changes similar to those described above may be performed upon identifying the unusual characteristics. For example, a program running at a customer device 200 may be attempting to repeatedly and recursively follow all the links of a web site being hosted by the provider network, and the traffic analyzer 116 may be able to detect this behavior, which may be considered undesirable behavior for that specific web site and/or may result in heavy traffic. In another example, defective software or hardware at a customer device 200 or some intermediate device between a customer device and the data center 110 may result in a looping series of requests, as a result of which large files may be requested repeatedly with a high frequency, and traffic analyzer 116 may be operable to recognize such patterns. In some cases similar techniques of modifying routing for specific target addresses may be used for providing different levels of services to different sets of customers, and not just for mitigating the effects of network attacks. For example, if traffic analyzer 116 detects that a lot of low-priority traffic is being directed at a particular server, and that this traffic may impact the responsiveness of a second server handling higher priority requests, the low priority traffic may be rerouted via the IP transit provider while the high priority traffic may continue to be routed over the backbone paths 140.

In FIG. 1, only a single example of an IP transit provider 180, and a single example of a settlement-free peering partner 170 are illustrated. In other embodiments, there may be multiple IP transit providers 180 providing paths between RPOPs 130 and data center 110, and multiple peering partners 170 may provide access to the provider network. In one embodiment where multiple IP transit providers are available, the routing information generator 114 may transmit the new routing information bypassing the backbone paths 140 to a selected subset of the multiple IP transit providers. For example, algorithms or heuristics that take into consideration the different costs and bandwidths available at the different IP transit providers may be used to determine an appropriate subset of IP transit providers that should be used for the traffic diversion away from the backbone. In other embodiments, the new routing information may be transmitted to all the IP transit providers available. In some embodiments, the new routing information may be transmitted directly from the data center 110 to the RPOPs 130, instead of being transmitted first to the IP transit providers 180.

In some environments, the transmission or propagation of an advertisement from the IP transit provider 180 to an RPOP 130 is an indication not merely of a route (e.g., that packets addressed to address 10.0.0.123 should be transmitted towards the advertising IP transit provider) but is also an indication of available quality of service (e.g., that the advertising IP transit provider 180 currently has enough resources to transmit packets addressed to 10.0.0.123 at an acceptable level of performance). In one such environment in one embodiment, the routing information generator 114 may transmit the new routing information to several IP transit providers (for example, to three IP transit providers), and only a subset of those IP transit providers (two out of the three) may propagate that routing information on to the RPOPs 130. In such a case, the reception of the new routing information from a subset of the initially available IP transit providers may be an indication to the RPOP 130 that only that subset is capable of transmitting subsequent traffic directed to the target address with adequate performance.

Some protocols used for propagating routing information define optional and/or configurable attributes that may be used by network operators to implement various network policies. For example, BGP provides a "communities" attribute (which may be referred to as a "community" attribute in some environments) that may be used in some implementations to provide an identifier to communicate capacity capability to RPOPs 130 and/or other sites within the provider network. The BGP communities attribute may be advertised initially from data center 110, and may reach the RPOPs 130 via one or more IP transit providers 180. In an implementation where multiple IP transit providers 180 exist, an RPOP 130 may inspect the communities attribute of a BGP message received from each of the multiple IP transit providers 180. The RPOP 130 may, in such an implementation, transmit additional traffic to a particular IP transit provider 180 only if the communities attribute received indicates that sufficient capacity is available along that route. The capacity information provided via the communities attribute may thus be helpful in selecting the subset of the IP transit providers 180 that may be used to transmit additional traffic to the data center 110. A variety of techniques may be used to examine the communities attribute—for example, the RPOP 130 may use regular expression matching on the communities attribute to determine capacity information. Other attributes (of BGP or other appropriate protocols) may be used for transmitting capacity information in other embodiments.

In one implementation, the RPOP may have two sets of routing information for the same address available to it: a first set for a range of addresses such as 10.0.0.0-10.0.0.255, and another for a single address within that range, e.g., 10.0.0.123. In such an implementation the more specific routing information (the one for 10.0.0.123 in this case) may override or supersede the more general routing information (the information covering the range in this example). In some alternative embodiments, routing information generator 114 may transmit new routing information directly to an RPOP 130, instead of or in addition to transmitting new routing information to the IP transit provider. For example, in such an alternative embodiment transmitted directly to RPOP 130B, the new routing information provided by routing information generator 114 may withdraw the route over the backbone path 140B from the set of routes available to the target address from RPOP 130B. In this example, when a new packet arrives at RPOP 130B addressed to the target address after the backbone path has been withdrawn, RPOP 130B may have to consult its routing tables to discover alternative routes available for that packet, and may discover that a route via IP transit provider 180 is the best available route for the new packet.

As indicated in an embodiment illustrated in FIG. 1, the data center 110 may comprise a plurality of servers, a traffic analyzer 116 and a routing information generator 114. In some embodiments, the RPOPs such as RPOP 130A may itself be incorporated at a similar data center which may contain its own set of servers and other devices such as storage devices, routers and the like. In some environments one or more of the RPOPs 130 may also include network intrusion detection devices similar to traffic analyzer 116. Not all the RPOPs 130 of a provider network may have equal access to the backbone in some environments; for example, some RPOPs expected to handle a smaller amount of customer traffic may have a smaller maximum backbone bandwidth available than other RPOPs that are anticipated to handle larger volumes of customer traffic.

Example Flows of Customer Traffic and Modified Routing Information

Figure 2:
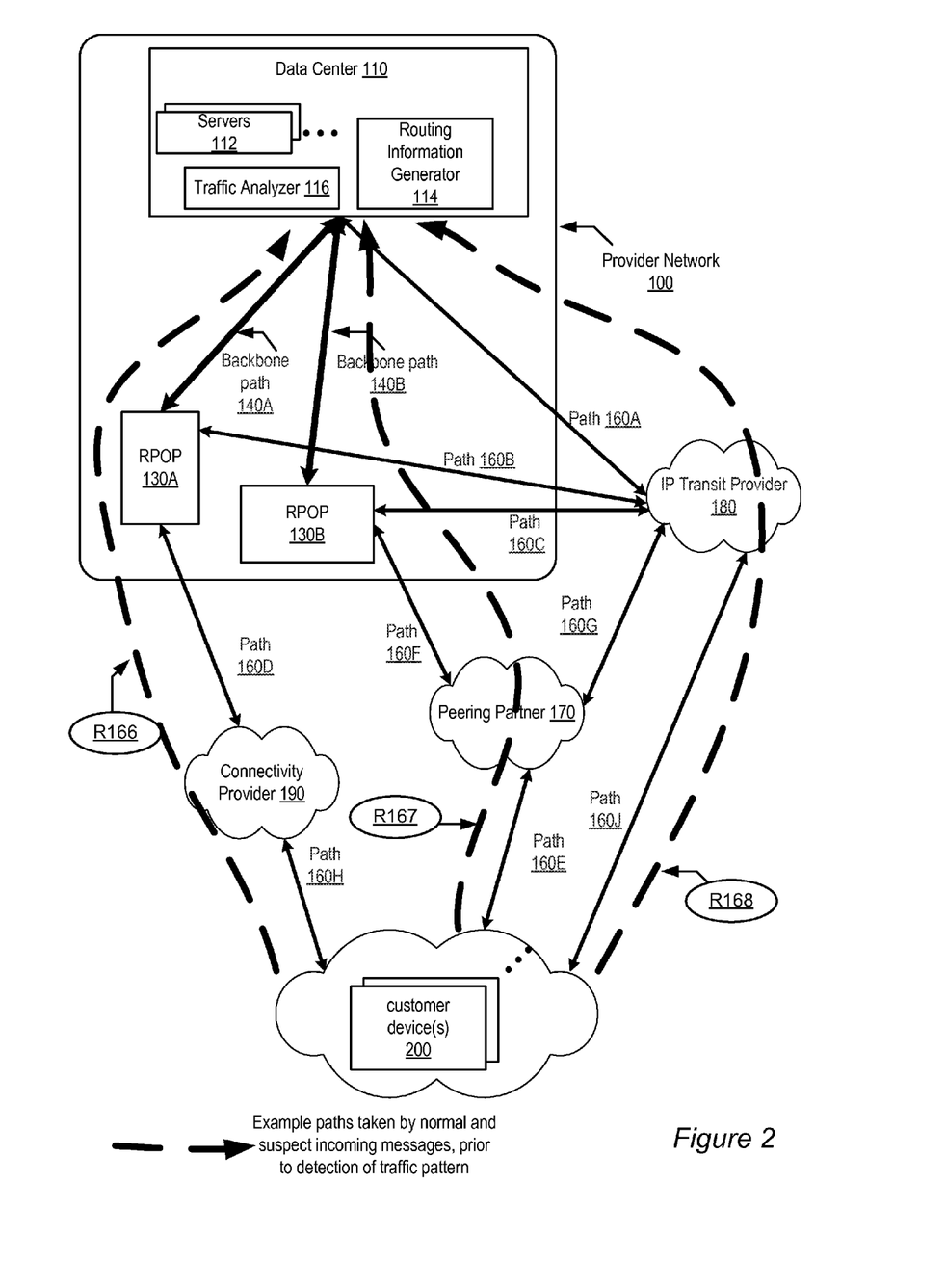
FIG. 2 illustrates examples of the paths taken by messages addressed to a server at a data center, prior to the detection of a traffic pattern, according to some embodiments.

FIG. 2 illustrates examples of the paths taken by messages addressed to servers 112 prior to the detection of a traffic pattern by traffic analyzer 116, according to some embodiments. In FIG. 2, three routes R166, R167 and R168 are shown between customer devices 200 and servers 112 using dashed lines. Since the point in time illustrated in Figure is prior to the traffic analyzer 116 matching a traffic profile, the traffic over all three routes R166, R167 and R168 may include both legitimate and illegitimate or attack traffic. In the case of R168, traffic from customer device 200 is transmitted over path 160J to IP transit provider 180. One or more routers at IP transit provider 180 determine, using routing information initially provided to the IP transit provider 180 from data center 110, that the traffic received via 160J should be routed to the data center over path 160A.

In the case of R167, a router at peering partner 170 receives customer traffic over path 160F, looks up the routing information previously provided to it (either via IP transit provider 180, RPOP 130B, or from some other source), and determines that the traffic should be sent over path 160F to RPOP 130B. RPOP 130B in turn looks up its routing information, and sends on the customer traffic towards server 112 over backbone path 140B. Another connectivity provider 190 receives customer traffic bound for data center 110 over path 160H, consults its routing information, and determines that the traffic should be sent to RPOP 130A over path 160D. RPOP 130A consults its own routing information, and transmits the traffic over backbone path 140A to the data center 110. Thus, route R166 includes paths 160H, 160D and backbone path 140A. In some environments traffic may be routed directly from customer networks containing devices 200 to one of the RPOP 130s—i.e., without passing through settlement-free peering partners 170 or other third-party connectivity providers 190. Traffic analyzer 116 examines the traffic from all three illustrated routes R166A, R166B and R166C to determine whether it matches any traffic profile that the analyzer is capable of detecting. As long as no such profile is matched, the incoming traffic is passed on towards the targeted server 112.

Figure 3:
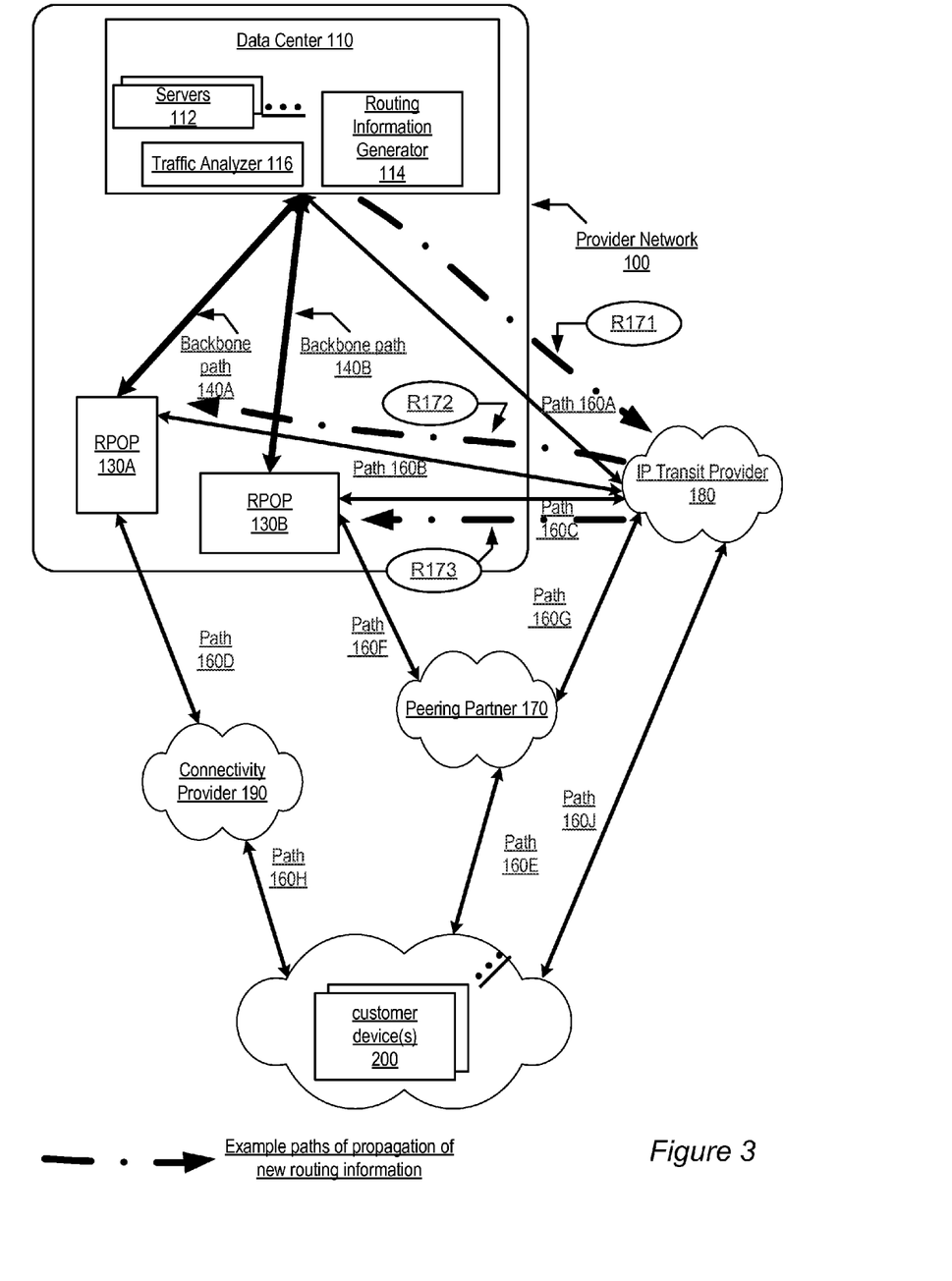
FIG. 3 illustrates examples of the paths over which new routing information may be propagated upon detecting a traffic pattern to a target address, according to at least some embodiments.

FIG. 3 illustrates examples of the paths over which new routing information may be propagated upon detecting a traffic pattern to a target address at one of the servers 112, according to at least some embodiments. When it detects a traffic pattern that indicates that a routing change should be put into effect, traffic analyzer 116 may provide the target address and any other needed information to the routing information generator 114. Routing information generator 114 (which may in some embodiments be embedded within the traffic analyzer 116, and may be a separate router linked to traffic analyzer 116 in other embodiments) may consult its current routing tables, generate and format the new routing information in accordance with the appropriate protocol, and transmit the new routing information to the IP transit provider 180 along the path designated by the label R171 in FIG. 3. One or more routers at the IP transit provider 180 may in turn consult their own routing tables and propagate the new routing information on to routers within RPOPs 130A (over path R172 in FIG. 3) and RPOP 130B (over path R173 in FIG. 3). In some embodiments the new routing information may be further propagated—e.g., from RPOP 130B to routers at peering partner 170, from RPOP 130A to routers at connectivity provider 190, and so on. Eventually the new routing information may also reach routers within customer networks (e.g., networks comprising customer devices 200) in some environments. As noted above, the propagation of the new routing information from IP transit provider 180 to an RPOP 130 may in some implementations imply not that the newly advertised route is available from the RPOP to the target address, but that the IP Transit Provider advertising the route has the resources (e.g., bandwidth) available to handle new traffic directed at the target address from the RPOP with the desired quality of service. As noted earlier, in some implementations the new routing information may include data that specifies the relative cost of a given route, according to some pre-defined metric, and this information may be taken into account at various routers (e.g., at the RPOPs 130 or the peering partners 170) when determining where to route incoming traffic.

Figure 4:
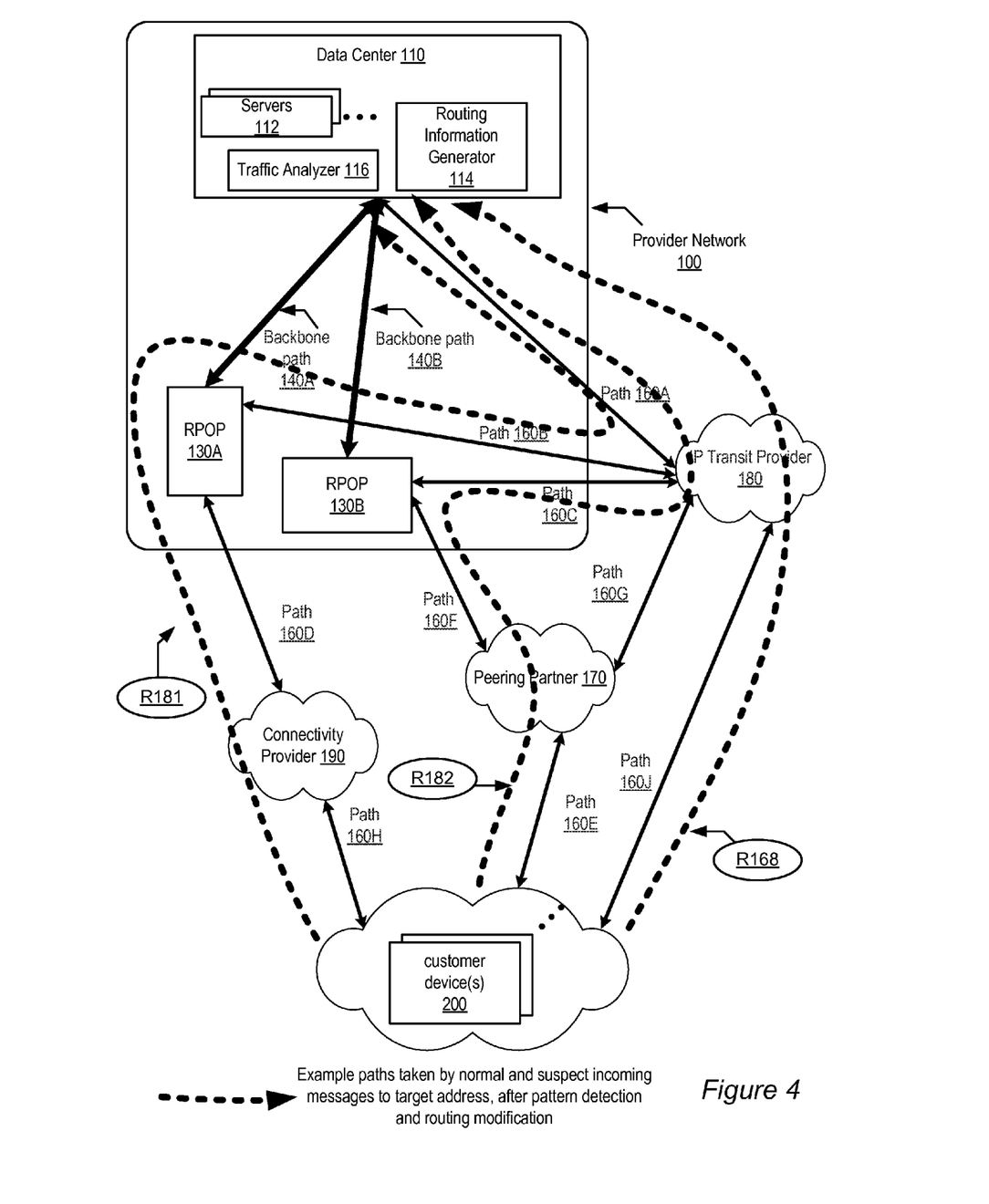
FIG. 4 illustrates examples of the paths over which incoming messages directed at the target address may be transmitted after the new routing information has been propagated, according to at least some embodiments.

FIG. 4 illustrates examples of the paths over which incoming messages directed at the target address may be transmitted after the new routing information has been propagated, according to at least some embodiments. Three example paths R181, R182 and R168 are shown. In the case of R181, traffic that would otherwise have been transmitted over the backbone path 140A from RPOP 130A is now transmitted to the data center via IP transit provider 180 as a result of the new routing information having reached RPOP 130A. Similarly, in the case of R182, traffic that would have been sent from RPOP 130B to the data center over backbone path 140B is now transmitted over path 160C to the IP transit provider 180, and from the IP transit provider 180 to the data center over path 160A. Traffic that was earlier being transmitted from customer devices to IP transit provider 180 via path 160J and from the IP transit provider 160J to the data center 110 via path 160A continues to be transmitted over the same path (R168) as was used in the example shown in FIG. 2. The traffic that is diverted away from the backbone paths 140A and 140B may include both legitimate traffic and suspect traffic addressed to the specific server 112 for which a profile was matched. Traffic to other servers 112 of data center (i.e., servers for which the traffic analyzer 116 has not matched a traffic profile) from the RPOPs 130 continues to be transmitted over the backbone (paths R166 and R167).

Figure 5:
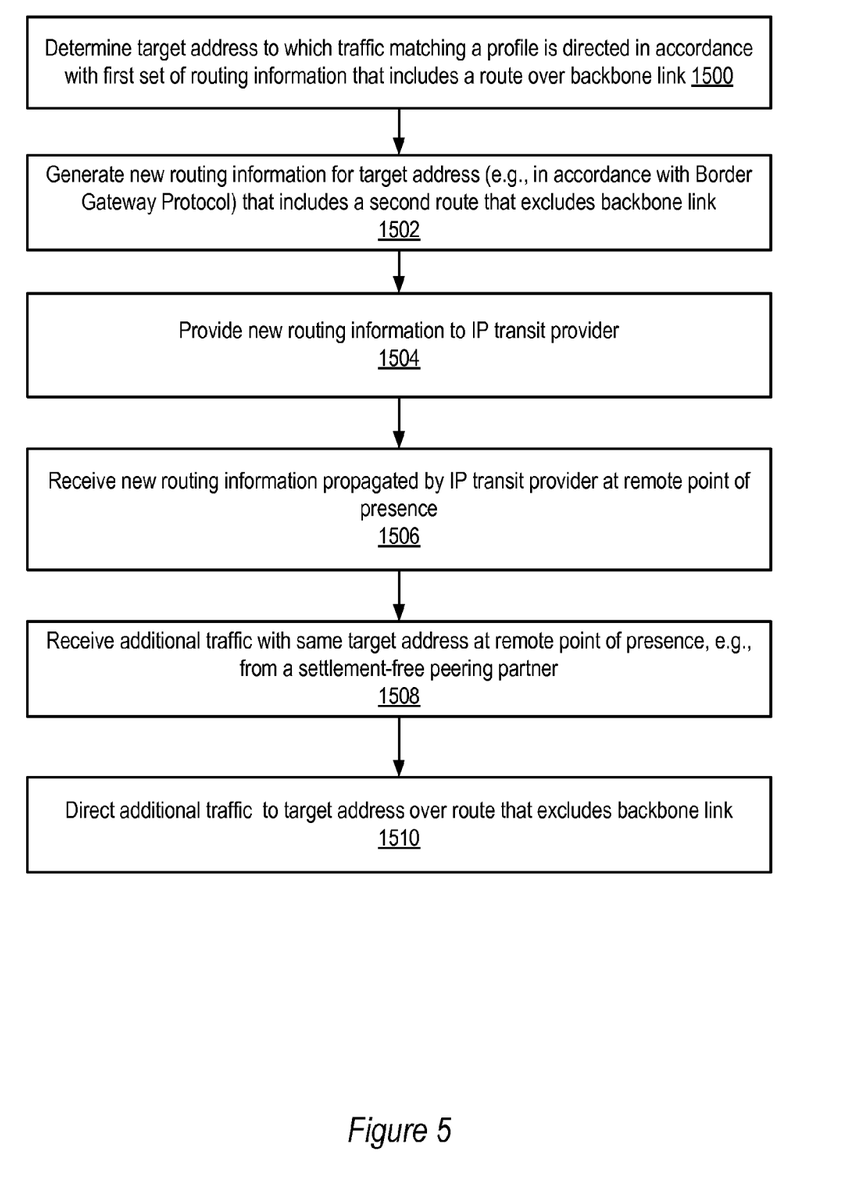
FIG. 5 is a flowchart of a method for responding to the detection of a pattern of traffic matching a profile being directed to a target address within a data center, according to at least some embodiments.

FIG. 5 is a flowchart of a method for responding to the detection of a pattern of traffic matching a profile being directed to a target address within a data center, according to at least some embodiments. As indicated by 1500 in the flowchart, a traffic analyzer may determine a target address to which traffic matching a profile is directed, where the traffic was directed in accordance with a first set of routing information that includes a route over a backbone link of a provider network. As noted earlier, the profile matching may indicate a high probability of a network-based attack, such as a denial of service attack, in some implementations, or may simply indicate other types of unusual traffic patterns that could potentially negatively impact service provision for legitimate customer requests in other implementations.

In response to the determining that the profile matches, new routing information may be generated (1502 in the flowchart), which includes a second route to the same target address that excludes the backbone link. The new routing information may be provided to an IP transit provider, as indicated at 1504 in the flowchart. The new routing information may be formatted, generated and transmitted in accordance with any desired appropriate protocol, such as the Border Gateway Protocol (BGP). The new routing information may be received at an RPOP of the provider network from the IP transit provider (1506 in the flowchart). After receiving the new routing information, when the RPOP receives additional traffic with the same target address (1508 in the flowchart), for example from a settlement-free peering partner that has transmitted a customer request to the RPOP, the RPOP directs the additional traffic over the route that excludes the backbone link. Thus the backbone links are protected from the suspect traffic that may otherwise have led to excessive backbone congestion or even apparent service failures.

Figure 6A:
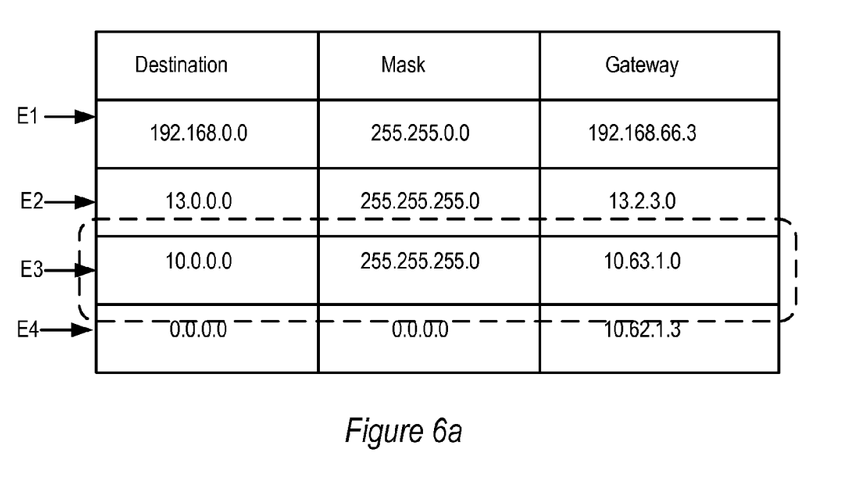
FIGS. 6a and 6b illustrate examples of routing table entries at a remote point of presence before and after new routing information has been propagated, according to at least some embodiments.
Figure 6B:
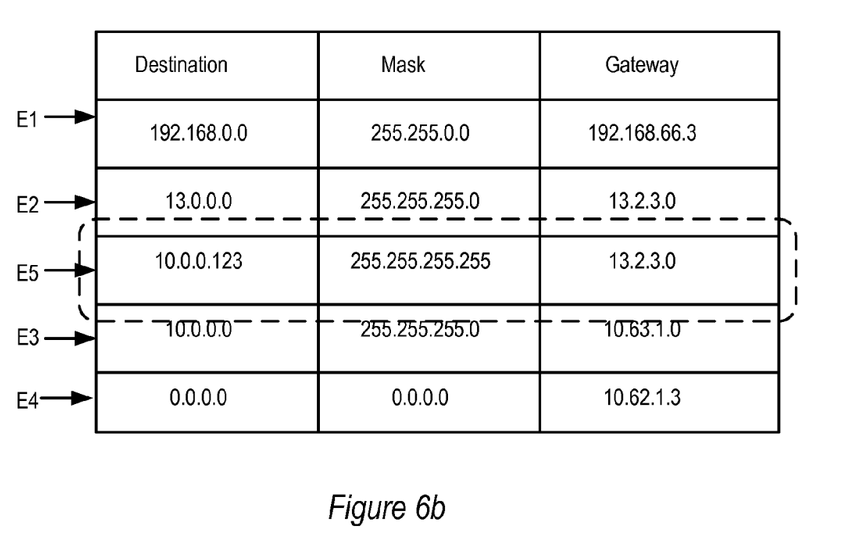

FIGS. 6a and 6b illustrate examples of routing table entries at a remote point of presence (e.g., RPOP 130B) before and after new routing information has been propagated as indicated in FIG. 5, according to one embodiment. FIG. 6a shows routing table entries E1, E2, E3 and E4 that are present at a router of RPOP 130B before new routing information is generated in step 1502 of FIG. 5. Each routing table entry includes a route destination field (e.g., 192.168.0.0 for entry E1), a mask field (255.255.0.0 for entry E1), and a gateway field (192.168.66.3 for entry E1). The gateway 10.63.1.0 in this example is located at data center 110, and is reachable from RPOP 130B via backbone path 140B. The gateway 13.2.3.0 is located at an IP transit provider 180, and the default gateway for the RPOP router is 10.62.1.3. The routing tables at RPOP 130B may include other entries (not shown in FIGS. 6a and 6b), and in some implementations each entry may include additional information (such as cost metrics). The routing table entry fields may be structured and formatted differently than shown in FIGS. 6a and 6b in various embodiments.

When the RPOP router receives a packet, it examines the destination address specified in the packet. For example, the RPOP router may receive a packet addressed to 10.0.0.34, one of the addresses of servers 112 at data center 110. The router then scans the routing table for a "match" for the destination address as follows. For each entry in the routing table, the router applies the entry's mask to the packet's destination address (e.g., by performing a bitwise AND operation between the mask and the address), and compares the result with the route destination of that entry. If the result matches, the packet may be routed to the gateway specified in that entry. If multiple entries in the routing table match, in the illustrated implementation, the packet may be routed based on the most specific routing table entry—the one with the most bits set in the mask field. In other implementations other criteria such as route costs, load balancing, and/or other policies may also be taken into consideration.

When a packet directed at 10.0.0.34 is received by the RPOP router with the routing table entries shown in FIG. 6a, for example, the router first applies E1's mask 255.255.0.0 on 10.0.0.34, resulting in 10.0.0.0; since this does not match E1's destination field 192.168.0.0, E1 is rejected. Next, E2's mask 255.255.255.0 is applied to 10.0.0.34, and since the result 10.0.0.0 does not match E2's destination 13.0.0.0, E2 is also rejected. In the case of E3, the result of applying the mask 255.255.255.0 to 10.0.0.34 is 10.0.0.0, which does match the destination field of E3; therefore, gateway 10.63.1.0 is a candidate for routing the packet. Routing table entry E4 (the entry for the default gateway 10.62.1.3) also matches, but since the mask field of E3 has more bits set than the mask field of E4, E3 is selected, and the packet addressed to 10.0.0.34 is sent to E3's gateway 10.63.1.0 via a backbone path. Similarly, if a packet addressed to 10.0.0.123 rather than 10.0.0.34 is received, E3 is selected and the packet is sent to E3's gateway 10.63.1.0 via the backbone.

In this example, a pattern of traffic matching a suspicious profile is found to be directed to 10.0.0.123. New routing information for this target address 10.0.0.123 is sent to IP transit provider (1504 of FIG. 5) and received at RPOP 130B (1506 of FIG. 5). The routing table at RPOP 130B now includes entry E5 with destination 10.0.0.123 shown in FIG. 6b. A packet addressed to 10.0.0.123 will now be routed using entry E5, even though both E5 and E3 match the address 10.0.0.123, since E5's mask entry has more bits set than E3's mask entry. Therefore, the packet addressed to 10.0.123 will now be transmitted to E5's gateway entry, 13.2.3.0, which is at an IP transit provider 180, thus bypassing the backbone path that would have been used had E3's route been selected. When a subsequent packet addressed to 10.0.0.34 (or any other address 10.0.0.X different from 10.0.0.123) arrives after this routing change, it will still be matched with E3 as described above, and will be directed to E3's gateway 10.63.1.0 via a backbone path.

Resumption of Backbone Routing

Figure 7:
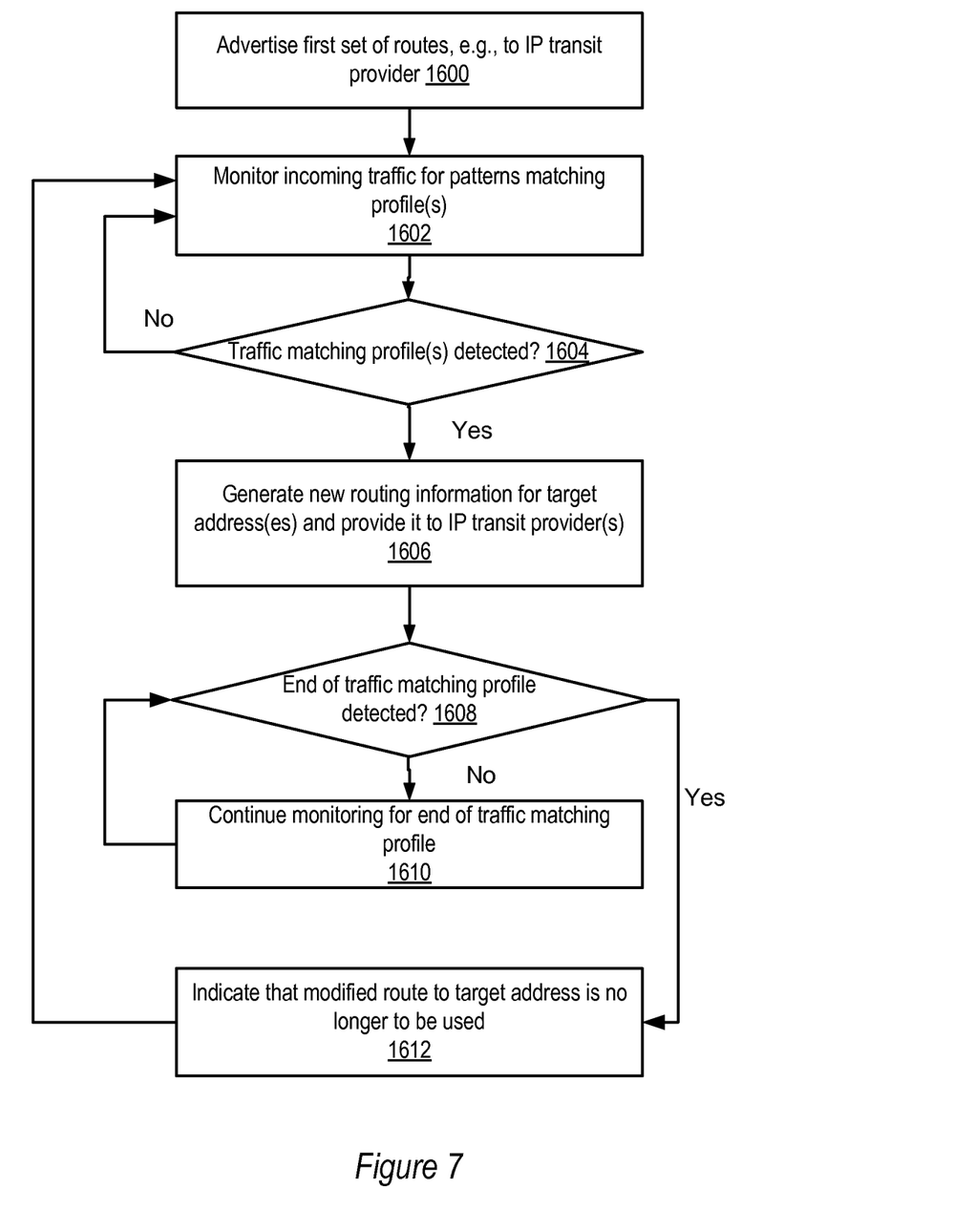
FIG. 7 is a flowchart depicting the operations of a traffic analyzer and a routing information generator, during normal operations and during periods when traffic matching a profile is being received, according to at least some embodiments.

In some implementations the diversion of traffic away from the backbone may be temporary, and the routing from the RPOPs to the target address may be restored after the suspected attack or other undesirable network traffic behavior is found to have ceased. FIG. 7 is a flowchart depicting the operations of a traffic analyzer and a routing information generator at a data center, during normal operations and during periods when traffic matching a profile is being received, according to at least some embodiments. As shown in the flowchart at 1600, during normal modes of operation, the routing generator may advertise a first set of routes, for example to an IP transit provider. The traffic analyzer may then monitor incoming traffic for patterns matching one or more profiles (1602). As long as the traffic does not match any profile, the traffic analyzer may simply continue to monitor the traffic and may not initiate the generation of any routing changes. If the traffic matches a profile, as detected at 1604, the analyzer and routing information generator may enter a mitigation mode, where new routing information intended to prevent suspect traffic from being routed over the backbone is generated and propagated to the appropriate routers, e.g., at the IP transit providers (at 1606 in the flowchart). Once the mitigation mode is entered, the traffic analyzer may, in addition to continuing to monitor the incoming traffic directed at other addresses for profiles, also monitor the traffic now sent towards the targeted address to determine whether the profile continues to be matched (1610). When and if the traffic no longer matches the profile (detected at 1608), the routing information generator may send an indication that the backbone-avoiding route need no longer be used for the target address (1612 in the flowchart). For example, the modified route that avoids the backbone may be withdrawn using a new route advertisement sent to the IP transit provider, or some other set of messages to resume the use of the original set of routes that included the backbone routes may be sent to the IP transit providers and/or the RPOPs. The traffic analyzer and route information generator may then continue their normal operations.

Example Use Case

The techniques described above of responding to the detection of network traffic profiles by propagating modified routes may be used in a variety of provider network environments. For example, if the provider network is expanding quickly across new geographical regions and increasing the number of RPOPs rapidly, it may not be feasible to purchase and provision new traffic analyzers at a similar rapid pace, as such devices often tend to be fairly expensive. Total backbone bandwidth capacity may also be a significant constraint in such environments, especially in regions of the world where provisioning connectivity with the desired performance capabilities for backbone purposes is fairly expensive. At the same time, the frequency and intensity of network-based attacks such as distributed denial of service attacks continues to rise, and the provider network must limit the impact of such attacks to preserve the service levels required to retain its growing customer base. Where IP transit providers are available in such environments with sufficient bandwidth and with reasonable cost structures, the provider network may be able to effectively use the techniques of rerouting backbone traffic via IP transit providers, without increasing the number of traffic analyzers substantially.

Illustrative System

Figure 8:
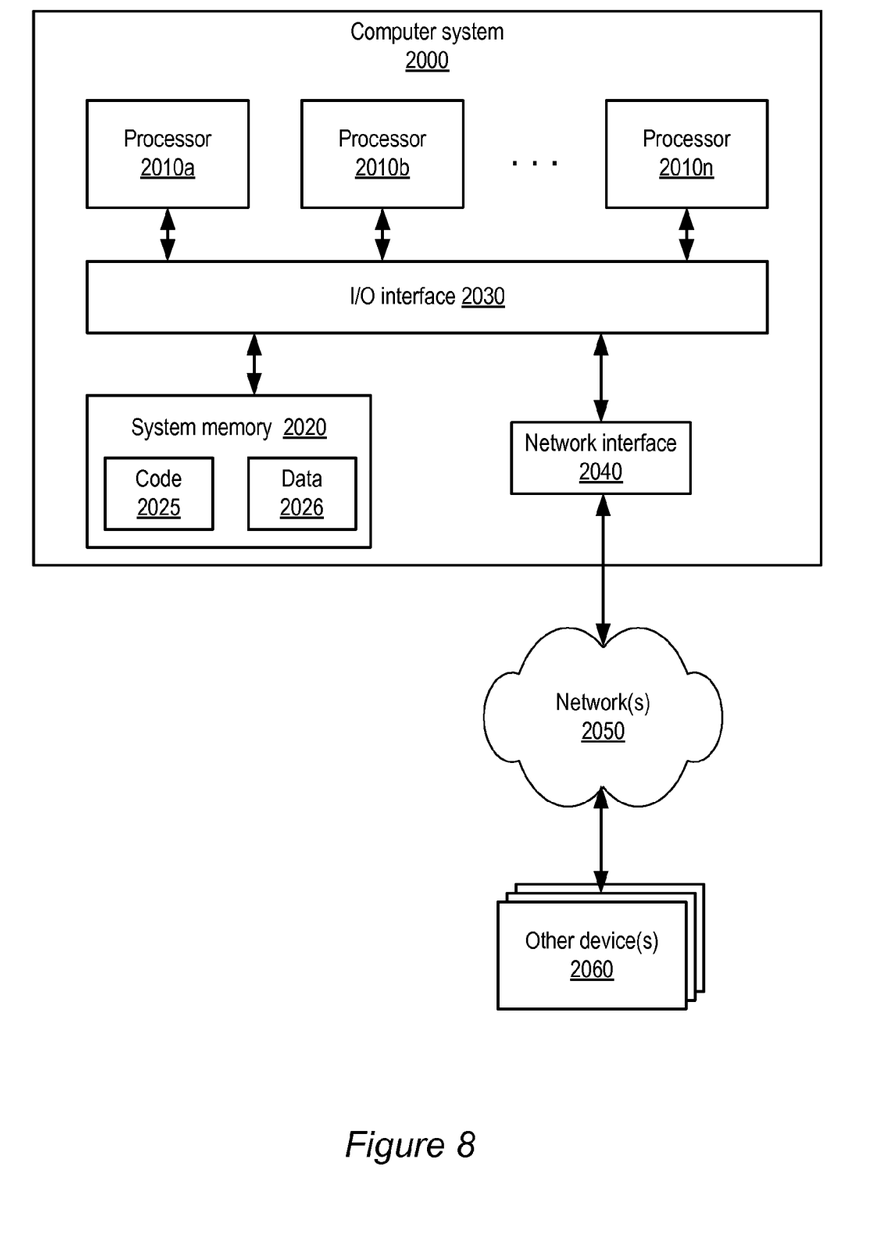
FIG. 8 is a block diagram illustrating an example computer system that may be used in some embodiments.

In at least some embodiments, a server that implements a portion or all of one or more of the technologies described herein, including the techniques to determine a target address to which a pattern of network messages matching a traffic profile and responding to such a detection by generating and propagating new routing information, and using the new routing information at a remote point of presence to direct additional traffic over a route that excludes a backbone path, may include a general-purpose computer system that includes or is configured to access one or more computer-accessible media, such as computer system 2000 illustrated in FIG. 8. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 4, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 6 for implementing embodiments of methods and apparatus for responding to detections of traffic patterns matching one or more traffic profiles. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A provider network, comprising:
a data center; and
a remote point of presence site linked to the data center by one or more private backbone links, wherein the remote point of presence site and the data center are both part of the same provider network, and wherein the remote point of presence site provides a point of presence for the data center to one or more other networks;
wherein the data center comprises:
a plurality of servers;
a traffic analyzer operable to determine a target address of a server of the plurality of servers, to which a pattern of network messages matching a traffic profile is directed in accordance with a first set of routing information, wherein the first set of routing informa- tion includes a first route to the target address over a private backbone link of the one or more private backbone links; and a routing information generator operable to:
generate, in response to a determination of the target address by the traffic analyzer, new routing information that includes a second route to the target address that excludes the private backbone network link, and
provide the new routing information to an Internet Protocol transit provider configured to propagate the new routing information to the remote point of presence; and wherein the remote point of presence is operable to:
receive the new routing information from the Internet Protocol transit provider, and
direct additional network traffic addressed to the target address over the second route.

2. The provider network as recited in claim 1, wherein the traffic profile is a profile of a denial of service attack.

3. The provider network as recited in claim 1, wherein the new routing information is generated in accordance with the Border Gateway Protocol.

4. The provider network as recited in claim 1, wherein the second route includes a path from the remote point of presence to the Internet Protocol transit provider.

5. The provider network as recited in claim 1, wherein the pattern of network messages matching the traffic profile is received at the remote point of presence from a settlement-free peer of the provider network, and transmitted from the remote point of presence to the data center via the private backbone link.

6. The provider network as recited in claim 1, wherein the pattern of network messages matching the traffic profile is received at the data center from the Internet Protocol transit provider.

7. The provider network as recited in claim 1, wherein the additional network traffic addressed to the target address is received at the remote point of presence from a settlement-free peer of the provider network.

8. The provider network as recited in claim 1, wherein the traffic analyzer is a scrubbing appliance.

9. A method, comprising:
determining a target address of a server to which a pattern of network messages matching a traffic profile is directed in accordance with a first set of routing information, wherein the first set of routing information includes a route to the target address over a private backbone network link of a provider network;
generating, in response to said determining, new routing information associated with the target address, wherein the new routing information includes a second route to the target address over a path that excludes the private backbone network link;
providing the new routing information to one or more routers of an Internet Protocol transit provider;
receiving the new routing information propagated by the Internet Protocol transit provider at a remote point of presence of the provider network, wherein the remote point of presence, the server, and the private backbone network link are part of the same provider network; and
from the remote point of presence, directing additional network traffic to the target address over the second route.

10. The method as recited in claim 9, wherein the traffic profile is a profile of a denial of service attack.

11. The method as recited in claim 9, wherein the new routing information is generated in accordance with the Border Gateway Protocol.

12. The method as recited in claim 9, wherein the second route includes a link from the remote point of presence to the Internet Protocol transit provider.

13. The method as recited in claim 9, wherein the pattern of network messages matching a traffic profile is transmitted from a settlement-free peer of the provider network to the remote point of presence, and from the remote point of presence to the target address.

14. The method as recited in claim 9, further comprising:
prior to determining the target address, analyzing network traffic to determine that the pattern of network messages matches the traffic profile.

15. The method as recited in claim 9, wherein the analyzing is performed by a network intrusion detector.

16. The method as recited in claim 9, further comprising:
after directing additional network traffic to the target address over the second route, determining that subsequent network traffic does not match the traffic profile;
generating modified routing information to allow network messages to be routed to the target address via the private backbone network link; and
providing the modified routing information to the one or more routers of the Internet Protocol transit provider.

17. A non-transitory computer-accessible storage medium storing program instructions computer-executable to implement:
receiving, at a remote point of presence of a provider network that comprises the remote point of presence, a data center and one or more private backbone links from the point of presence to the data center, a first set of routing information, wherein the first set of routing information includes a first route from the point of presence to a network address at the data center, wherein the first route includes a private backbone link of the one or more private backbone links;
transmitting a first set of network messages from the remote point of presence to the network address over the first route;
receiving, at the remote point of presence, an indication of a transmission of a pattern of network messages matching a traffic profile, wherein the transmission is targeted at the network address; and
in response to receiving the indication, transmitting additional network traffic from the remote point of presence to the network address over a second route, wherein the second route excludes the private backbone link.

18. The non-transitory computer-accessible storage medium as recited in claim 17, wherein the traffic profile is a profile of a denial of service attack.

19. The non-transitory computer-accessible storage medium as recited in claim 17, wherein the first set of routing information is generated in accordance with the Border Gateway Protocol.

20. The non-transitory computer-accessible storage medium as recited in claim 17, wherein the indication of the transmission of the pattern of network messages matching the traffic profile comprises routing information generated in accordance with the Border Gateway Protocol.

21. The non-transitory computer-accessible storage medium as recited in claim 17, wherein the indication of the transmission of the pattern of network messages matching the traffic profile is received at the remote point of presence from an Internet Protocol transit provider.

* * * * *